United States Patent
Brand

(10) Patent No.: US 9,473,419 B2
(45) Date of Patent: Oct. 18, 2016

(54) MULTI-TENANT CLOUD STORAGE SYSTEM

(71) Applicant: CTERA Networks, Ltd., Petach-Tikva (IL)

(72) Inventor: Aron Brand, Petach-Tikva (IL)

(73) Assignee: Ctera Networks, Ltd., Petach-Tikva (IL)

( * ) Notice: Subject to any disclaimer, the term of this patent is extended or adjusted under 35 U.S.C. 154(b) by 271 days.

(21) Appl. No.: 14/243,926

(22) Filed: Apr. 3, 2014

(65) Prior Publication Data

US 2014/0215590 A1    Jul. 31, 2014

Related U.S. Application Data

(63) Continuation-in-part of application No. 12/641,559, filed on Dec. 18, 2009, and a continuation-in-part of application No. 13/205,238, filed on Aug. 8, 2011, now Pat. No. 8,886,714.

(60) Provisional application No. 61/808,012, filed on Apr. 3, 2013, provisional application No. 61/140,071, filed on Dec. 22, 2008.

(51) Int. Cl.
| G06F 15/16 | (2006.01) |
| H04L 12/911 | (2013.01) |
| H04L 29/08 | (2006.01) |
| G06F 9/50 | (2006.01) |
| H04L 29/06 | (2006.01) |

(52) U.S. Cl.
CPC ............ *H04L 47/70* (2013.01); *G06F 9/5072* (2013.01); *H04L 63/0815* (2013.01); *H04L 67/1097* (2013.01)

(58) Field of Classification Search
None
See application file for complete search history.

(56) References Cited

U.S. PATENT DOCUMENTS

| 7,203,796 | B1 | 4/2007 | Muppalaneni et al. |
| 7,430,639 | B1 | 9/2008 | Bali et al. |
| 7,596,620 | B1 | 9/2009 | Colton et al. |
| 7,752,180 | B1 | 7/2010 | Fair et al. |
| 7,865,663 | B1 | 1/2011 | Nelson et al. |
| 2004/0054891 | A1 | 3/2004 | Hengeveld et al. |
| 2006/0010154 | A1 | 1/2006 | Prahlad et al. |
| 2006/0230076 | A1 | 10/2006 | Gounares et al. |
| 2006/0230245 | A1 | 10/2006 | Gounares et al. |
| 2007/0143589 | A1 | 6/2007 | Rawe et al. |
| 2007/0250593 | A1 | 10/2007 | Sikdar et al. |
| 2008/0005168 | A1 | 1/2008 | Huff et al. |
| 2008/0080552 | A1 | 4/2008 | Gates et al. |
| 2009/0006792 | A1 | 1/2009 | Federwisch et al. |
| 2009/0006869 | A1 | 1/2009 | Satya |
| 2009/0007234 | A1 | 1/2009 | Birger et al. |
| 2009/0031212 | A1 | 1/2009 | Hsu |
| 2009/0144422 | A1 | 6/2009 | Chatley et al. |
| 2009/0300169 | A1 | 12/2009 | Sagar et al. |
| 2010/0042720 | A1 | 2/2010 | Stienhans et al. |
| 2010/0088150 | A1 | 4/2010 | Mazhar et al. |
| 2010/0161759 | A1 | 6/2010 | Brand |
| 2010/0318632 | A1 | 12/2010 | Yoo et al. |

(Continued)

*Primary Examiner* — Brian P Whipple
(74) *Attorney, Agent, or Firm* — M&B IP Analysts, LLC

(57) ABSTRACT

A multi-tenant cloud storage system is provided. The cloud storage system a plurality of tenants, each tenant is configured to utilize an isolated logical partition of the cloud storage system accessible to a respective tenant portal, wherein the plurality of tenants includes at least a first type tenant and a second type tenant, each of the first type tenant and the second type tenant are configured to provision its respective set of members with a different storage policy.

15 Claims, 11 Drawing Sheets

(56) References Cited

U.S. PATENT DOCUMENTS

| | | | |
|---|---|---|---|
| 2010/0332401 A1* | 12/2010 | Prahlad | G06F 17/3002 705/80 |
| 2010/0332588 A1 | 12/2010 | Schwimer | |
| 2011/0054878 A1 | 3/2011 | Zhang et al. | |
| 2011/0082982 A1 | 4/2011 | Harvell et al. | |
| 2012/0137213 A1 | 5/2012 | Hayler et al. | |
| 2013/0204849 A1* | 8/2013 | Chacko | G06F 3/0604 707/692 |
| 2014/0082131 A1* | 3/2014 | Jagtap | G06F 9/5072 709/217 |
| 2014/0082156 A1* | 3/2014 | Jagtap | G06F 9/5027 709/220 |

* cited by examiner

MULTI-TENANT CLOUD STORAGE SYSTEM

CROSS-REFERENCE TO RELATED APPLICATIONS

This application claims the benefit of U.S. Provisional Application No. 61/808,012 filed on Apr. 3, 2013. This application is also a continuation-in-part of: (a) U.S. patent application Ser. No. 12/641,559, filed on Dec. 18, 2009, now pending, which claims the benefit of U.S. Provisional Application No. 61/140,071 filed on Dec. 22, 2008; and (b) U.S. patent application Ser. No. 13/205,238, filed on Aug. 8, 2011, now pending. All of the applications referenced above are herein incorporated by reference for all that they contain.

TECHNICAL FIELD

The present invention relates generally to network devices that are integrated with cloud services and, more specifically, to network devices that are integrated with cloud services allowing different levels of access to various user entities.

BACKGROUND

The demand for data storage has been rapidly escalating because as the amount of data such as digital media stored by users grows, so does their need to store digital media reliably over extended periods of time. Traditional backup solutions periodically copy data to, for example, backup tapes, compact discs (CDs), or other local storage media. However, such solutions are not optimal because the backup media is stored in a single location, and the media being used for backup has typically been prone to failure.

Commercially available services that are referred to as cloud storage services (CSS) provide mass storage through a web service interface available through the Internet. The storage infrastructure includes a distributed array of geographically distributed data centers connected to a plurality of clients through a wide area network (WAN). A data center typically consists of servers and mass storage to facilitate cloud storage services to the clients. Such services enable applications including, for example, backup and restore of data, data synchronization, file sharing, and so on.

Cloud storage services are accessible to users from anywhere in the world, through a client implementing a web services' interface designed to at least synchronize data with the data centers. However, such web services fail to provide standard file sharing protocols (e.g., common internet file system (CIFS) or network file system (NFS)). In addition, accessing files stored in the cloud storage from the LAN is typically many times slower than accessing files stored in storage devices on the same LAN.

A network attached storage (NAS) device for performing NAS operations with cloud storage services is also discussed in the related art. Such a NAS device provides the functionality of data storage, file-based operations (e.g., read, write, delete, modify, etc.), and the management of these functionalities to clients on the network. Specifically, a client can store data in its local storage which is also synchronized with a cloud storage service. The client can access and perform file-based operations either on its local storage or the cloud storage service. An access to the files in the device is only through a local area network, while access to the cloud storage is through a web portal. Devices) which are integrated with a cloud storage services are discussed in related art.

In a virtual environment of cloud storage systems, the storage services should be efficiently provided to multiple tenants. An organization, enterprise, or other entity utilizing the cloud storage service is referred to as a tenant, i.e., a paying customer for the cloud storage services. Different tenants are typically provisioned with different storage, performance, and security services based in part on a service package that each tenant purchased.

Existing solutions permit manual configuration of devices of a tenant. Such solutions allow a tenant to add devices to a tenant by manually configuring the device with the required details. Typically, this is a tedious and time consuming task. For example, to configure a tenant with thousands of devices would be a prolonged process.

It would therefore be advantageous to provide a solution that would overcome the deficiencies of the prior art by permitting enrollment of devices and their users in a tenant's subsection of a cloud storage system.

SUMMARY

Certain embodiments disclosed herein include a cloud storage system. The cloud storage system comprises a plurality of tenants, wherein each tenant is configured to utilize an isolated logical partition of the cloud storage system accessible to a respective tenant portal, wherein the plurality of tenants includes at least a first type tenant and a second type tenant, each of the first type tenant and the second type tenant are configured to provision its respective set of members with a different storage policy.

Certain embodiments disclosed herein also include a method for enrolling an endpoint in a cloud storage system. The method comprises, upon receiving a request to enroll an endpoint in the cloud storage system, determining a target tenant portal respective of the enrollment request; and associating the endpoint with a tenant portal in the CSS based in part on the identification of the target tenant portal.

Certain embodiments disclosed herein also include a system for enrolling an endpoint in a cloud storage system (CSS). The system comprises a processor; and a memory coupled to the processor, wherein the memory contains instructions that, when executed by the processor, configure the system to: enroll an endpoint in the cloud storage system, upon receiving an enrollment request, determine a target tenant portal respective of the enrollment request; and associate the endpoint with a tenant portal in the CSS based in part on the identification of the target tenant portal.

BRIEF DESCRIPTION OF THE DRAWINGS

The subject matter disclosed herein is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION

Figure 1:
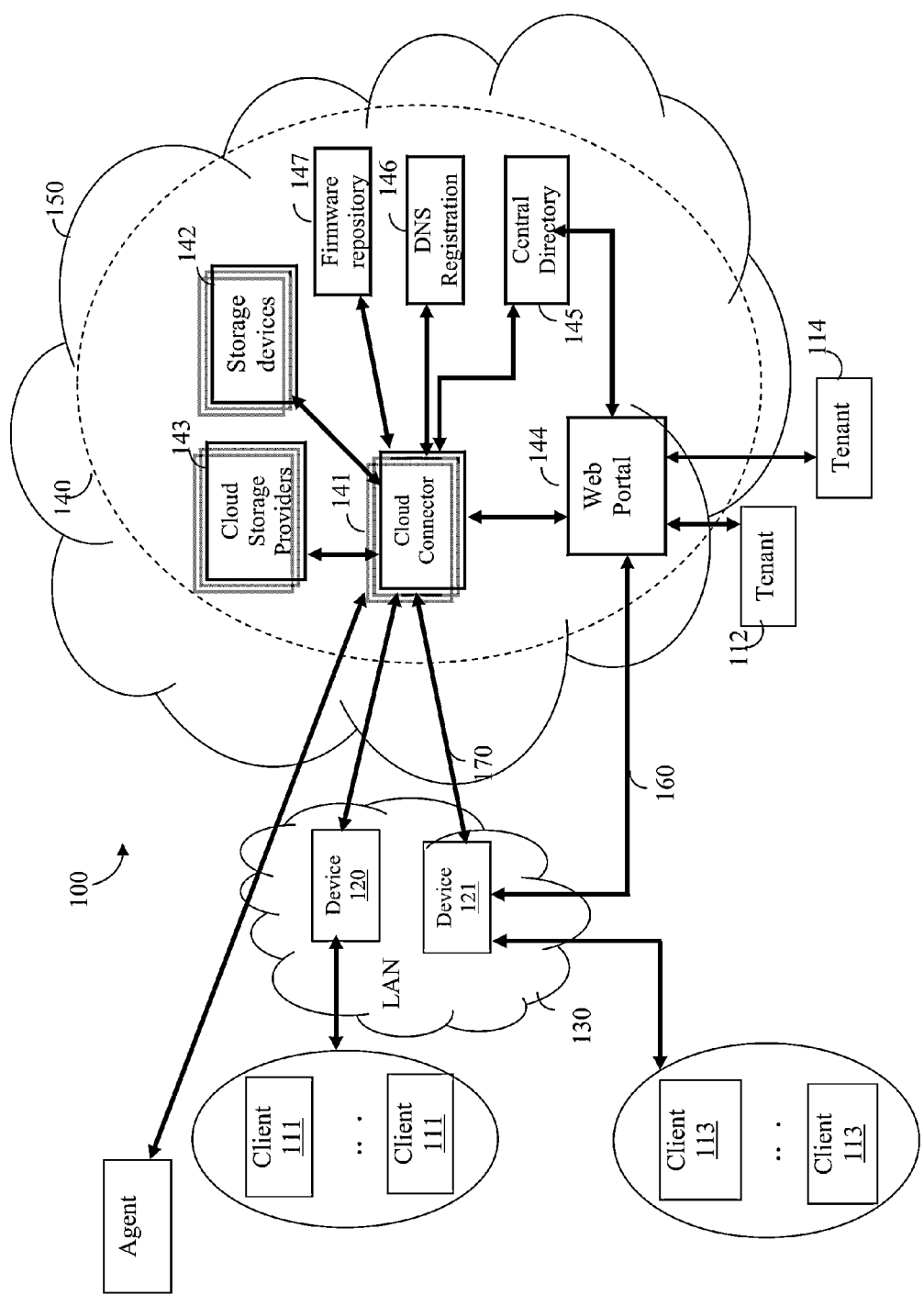
FIG. 1 is a network diagram of a multi-tenant storage system according to various embodiments.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to various embodiments, a tenant (frequently a paying customer of a cloud storage service provider) may own a private, isolated logical partition of the cloud storage system, referred to hereinafter as "tenant portal." Each tenant portal has a plurality of portal members, which may be individual end users and/or nested sub-tenants having their own tenant portal. Furthermore, each tenant portal has a plurality of associated endpoints, each owned by a specific portal member. An endpoint is a cloud-enable storage device or a software agent executed on a hardware device and configured to perform tasks of cloud-enabled storage devices. It should be noted that the end users and sub-tenants as will be discussed herein below are members of a tenant portal.

In various embodiments, in addition to tenant portals, a "global administration portal" exists. The global administration portal is an interface configured to allow management of the tenant portals (e.g., creation, deletion, modification, and the like of such portal). Typically, a provider of a cloud storage service has an access to the global administration portal, thereby allowing the provider to cater tenant portals to tenants as needed.

Each tenant portal is identified by a tenant portal ID. In an embodiment, the tenant portal ID is globally unique, such as a domain name server (DNS name or URL). Each tenant portal has an associated web-based user interface which is accessible, in the above embodiment, by connecting with a web browser to the tenant portal's DNS name or URL. Additionally, each portal member is identified by a unique member ID which can be, but is not limited to, an email address, a username, or another identifier that is unique within the scope of a single tenant portal.

FIG. 1 shows an exemplary and non-limiting diagram of a storage network system 100 utilized to describe the various embodiments. The system 100 includes a plurality of clients 111 associated with a tenant 112 and a plurality of clients 113 associated with a tenant 114. The pluralities of clients 111 and 113 are connected to a device 120 and 121 respectively through a local area network (LAN) 130, which may be either a wireless or wired network. In addition, the tenants' clients 111, 113 can access the devices 120, 121 through a network 150 which may be the Internet or a wide area network (WAN).

Each device 120 and 121 is connected to a cloud storage system (CSS) 140 through the network 150. The CSS 140 includes a plurality of cloud connectors 141 that facilitate connections between the devices 120 and/or 121 and storage devices 142 (e.g., disk drives and/or SAN/NAS devices) as well as connections to public cloud storage providers 143 (e.g., Amazon® Web Services, Google®, etc.).

Each of the devices 120 and 121 is a cloud-enabled device that provides cloud storage services. An example of such a device is disclosed in the co-pending patent application Ser. No. 12/641,559, referenced above. A device 120 or 121 acts as endpoint as defined above.

Each device 120 and 121 may be connected in the LAN 130, and as such is protected by a firewall (not shown) that protects the device from remote access attempts through the Internet. Commonly, the firewall acts also as a NAT device, translating private IP addresses of a device in the LAN to one or more public IP addresses, which are possibly dynamic addresses.

The tenants' clients can remotely access the devices 120 and/or 121 through the network 150. With this aim, the CSS 140 is also configured to include at least one cloud relay server 144, a central directory 145, and a DNS registration unit 146 all connected to the cloud connectors 141.

Each of the cloud connectors 141 is assigned with an internet protocol (IP) address. As part of the enrollment process described in further detail below, each device 120, 121 is configured to establish a management link 170 with one of the cloud connectors 141 that is selected arbitrarily. The management link 170 is an active connection secured using a communication protocol including, but not limited to, Transport Layer Security (TLS), Secure Sockets Layer (SSL), IPSEC, and the like. The device 120, 121 is configured to send periodical "keep-alive" messages over the management link to ensure that the connection is alive. If the connection is lost, the management link 170 is re-established by the respective device. As an outgoing connection, the management link 170 is typically permitted to pass through any firewall and/or NAT device connected in the LAN 130. Over the management link 170, the cloud connectors 141 and the devices 120 and 121 can reliably exchange incoming and outgoing messages.

The cloud connectors 141 use the central directory 145 to keep records of which device 120 is currently connected to which connector 141. It should be noted that although two devices 120, 121 serving two different tenants are shown in FIG. 1, the system 100 may include more than two such devices and support more than two tenants. Thus, the cloud connectors 141 can manage the connections to multiple cloud-enabled storage devices (or endpoints) and multiple tenants.

The cloud relay server 144 has a secure and trusted communications channel to the cloud connectors 141 and central directory 145. In some embodiments, when a tenant is added to the system 100, a unique DNS record is created for the tenant portal. Specifically, the domain name of the tenant portal (e.g., "tenantname.myservice.com") may be mapped to an IP address of the cloud relay server 144. In an exemplary embodiment, the mapping is performed by insertion of an address record "A" Type record as described, for example, by IETF RFC 1035, DOMAIN NAMES—IMPLEMENTATION AND SPECIFICATION, P. Mockapetris, Section 3.2.2. Such mapping may be performed by a DNS registration unit 146 under the control of a cloud connector 141. For Load balancing between multiple cloud relay servers, techniques such as, but not limited to, round robin DNS can be employed. It should be noted that in certain exemplary embodiments, the cloud relay server 144 and cloud connectors 141 may be implemented as a single server combining both functions.

Users can remotely access the devices 120 and 121 using the HTTP protocol, over the network 150 through the cloud relay server 144. Specifically, a secure tunnel 160 is established from each device 120, 121 to the cloud relay server 144, under the control of the cloud connector 141. As an example, over the secure tunnel 160, a user of a client 113 can access the device 120, e.g., using an HTTP or HTTPS protocol. The cloud-enabled storage devices 120 and 121 provide to their respective clients an access to a user interface, through which the tenants' clients can manage and access resources of the devices 120 and 121. Such operations include file-based operations, uploading/downloading files, and configuring various settings of the devices 120, 121 using the user interface.

The methods for enabling a remote access to a cloud-enabled device that provides cloud services and optimizes the communication between a client and cloud-enabled device are further described in co-pending patent application Ser. No. 13/205,238, referenced above, assigned to common assignee.

According to various disclosed embodiments, multiple individual tenants can be defined in a single CSS 140 and share the same set of cloud connectors 141 and cloud storage providers 143. The tenants 112 and 114 may share the same set of servers, and shared storage back end. However, the multi-tenancy solution presents each tenant with an independent tenant portal, each having its own administrators, users, configuration settings and so on. Therefore, there is no need to create and manage separate farms of servers and storage for each of the tenants. In an embodiment, a tenant portal may be realized as a web portal.

According to an exemplary embodiment, at least two different types of tenants and two different types of respective tenant portals can be configured within the single CSS 140. For the sake of simplicity and without limitation a first type of tenant (e.g., tenant 112) is referred hereinafter as type-A tenant and a second type of tenant (e.g., tenant 113) is referred hereinafter as type-B tenant. The respective tenant portals are defined as type-A portal and type-b portal. As a non-limiting example, a type-A tenant is a reseller tenant, while a type-B tenant is a team tenant, where each tenant type has an associated type of tenant portal, i.e., "reseller portal" and "team portal," respectively. It should be appreciated that discussion of various embodiments will refer to a type-A portal that belongs to a reseller tenant and a type-B portal that belongs to a team tenant. These discussions are not intended to limit the scope of the various embodiments and are only performed for the sake of simplicity.

In a type-B portal, members of the tenants may collaborate with each other on files stored in their portal and search for other portal members to collaborate with.

The type-A portal can be defined with features and functions for the needs of its tenant. For example, a reseller portal includes reseller-oriented features, such as add-ons, plans, vouchers, invoice generation, self-registration, and credit card billing. The end users (e.g., clients 111) in the reseller portal are typically the reseller's subscribers. A reseller portal may further comprise one or more sub-resellers. Members of the type-A portal are not aware of each other, and operate in complete isolation.

When multiple type-A portals are created, each such portal can be leased to a different member (e.g., reseller), as part of a multi-tenant or hierarchical business model. Each such member can log in to their own tenant portal, manage their subscribers, and define subscription plans, branding, and pricing models. Nested type-A portals can also be created and, in such case, the nested portal behaves as a sub-tenant of the user.

The type-B portal is a type of portal utilized by a tenant, such as a company or team with multiple members, and as such does not include support for features and functions defined in type-A portal. The members in the type-B portal are typically the members of an organizational team.

In an embodiment, by default, all users in the type-B portal share a single deduplication domain and encryption key, enabling source de-duplication between all members of the group while maintaining full cryptographic isolation from users of other tenants.

When multiple type-B portals are created, the CSS 140's owner can assign each member of such portal to a different organizational unit within the organization. Each organizational unit can log in to its tenant portal and manage their settings. In contrast, the CSS' 140 owner can access and manage the contents of any team portal, as well as manage global settings across all tenant portals.

In an exemplary embodiment, the CSS 140 includes two levels of resource provisioning: end-user provisioning (available in a reseller portal for a reseller type of tenant) and portal-level provisioning. In end-user provisioning, the tenant portal owner provides end users with services and/or quotas, such as storage space, number of agents, and more. In a team portal, a storage quota per team member can be defined. In portal-level provisioning, the CSS 140 owner provisions each tenant portal owner with services and/or quotas. For example, it is possible to limit a tenant portal to use a total of up to 100 GB of storage space and 50 agents.

According to one embodiment, the multi-tenancy support in a single CSS is enabled using a DNS registration unit (e.g., DNS registration unit 146) as discussed above. The DNS name may be utilized in order to know to which tenant a client tries to connect.

Each tenant can have a different user interface package installed for allowing users to match the similar look-and-feel graphical user interface. The user interface package may include, for example, cascading style sheet, HTML, JavaScript, and image files, which allow overriding a standard look and feel of a preconfigured tenant portal.

The following provisioning methods may be available for tenant-level provisioning: tenant subscription plans and tenant add-on packages. In order to obtain services, tenants may subscribe to a tenant subscription plan. Each tenant portal can be subscribed to a single plan. The tenant subscription plan defines a set of services that subscribed portals receive, and which subsequently be used by the portal's end users or sub-tenant. Further, the subscription plan can specify parameters such as the previous file version's retention policy for the portal.

The resources provisioned to a type-A portal are consumed when resources are allocated to an end user or sub-tenant of the portal. In contrast, the resources provisioned to a type-B portal are consumed when they are used by members of the portal. For example, if a reseller provisions a 10 GB storage quota to an end user, then 10 GB of the reseller's storage space quota is consumed immediately, regardless of whether the end user actually uses the entire 10 GB of storage space. In contrast, if a team portal administrator sets a 10 GB storage quota to a team user, then none of the team's storage space quota is consumed. Storage quota of the team is consumed only when the team user actually stores files.

Tenants can also subscribe to add-on packages, in addition to their basic subscription plan. Each tenant add-on package defines a set of services that portals receive in addition to the services specified in the tenant subscription plan, for a specified period of time. For example, an add-on package may include an additional 10 GB of storage space for the number of devices specified in an initial tenant subscription plan.

In another exemplary embodiment, tenant portals are limited to one subscription plan, but add-on packages can be stacked on top of subscription plans as desired. For example, a portal may have a subscription plan for 100 GB of storage, as well as two add-on packages for 10 GB of storage and one add-on package for 5 GB of storage. While the add-on packages are valid, the portal will be entitled to allocate up to 125 GB of cloud storage to end users.

Figure 2:
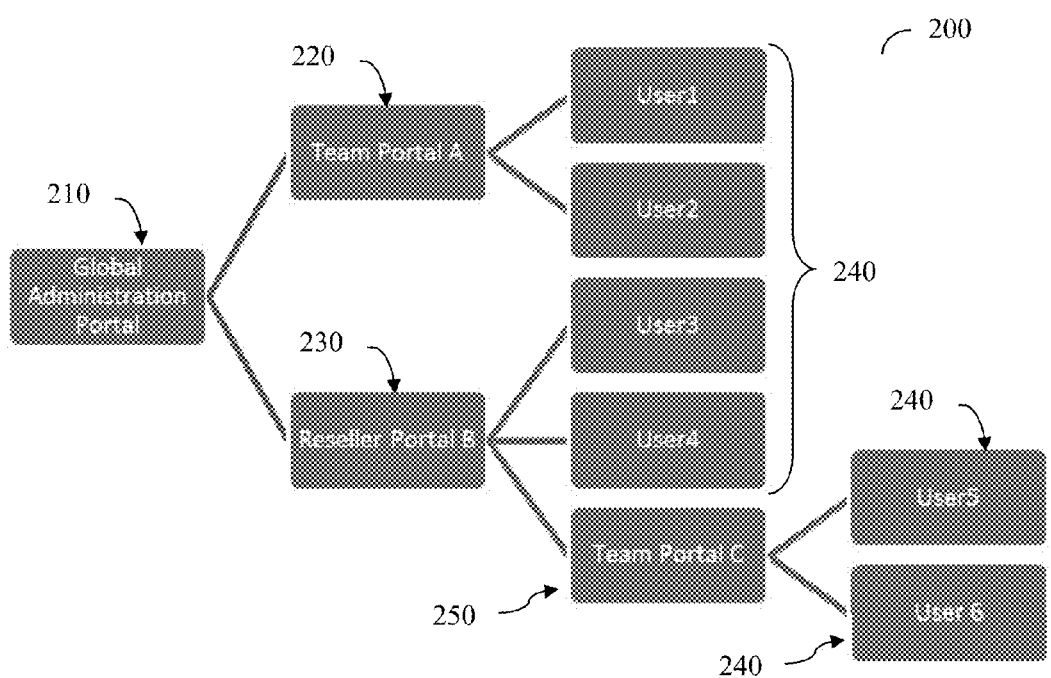
FIG. 2 is a schematic diagram of a multi-tenant cloud storage system according to an embodiment.

FIG. 2 is a non-limiting schematic diagram 200 of a multi-tenant cloud storage system arranged according to an embodiment. In the embodiment, a global administration portal 210 includes two tenant portals: a type-B portal 220 and a type-A portal 230. Each of the portals 220 and 230 may further include a plurality of users (sub-tenants) 240-1 through 240-n. In addition, a type-A portal 230 may also include a plurality of type-B portals which may further include more users. In this embodiment, a type-A portal 230 includes a type-B portal 250, which further includes users 240.

Figure 3:
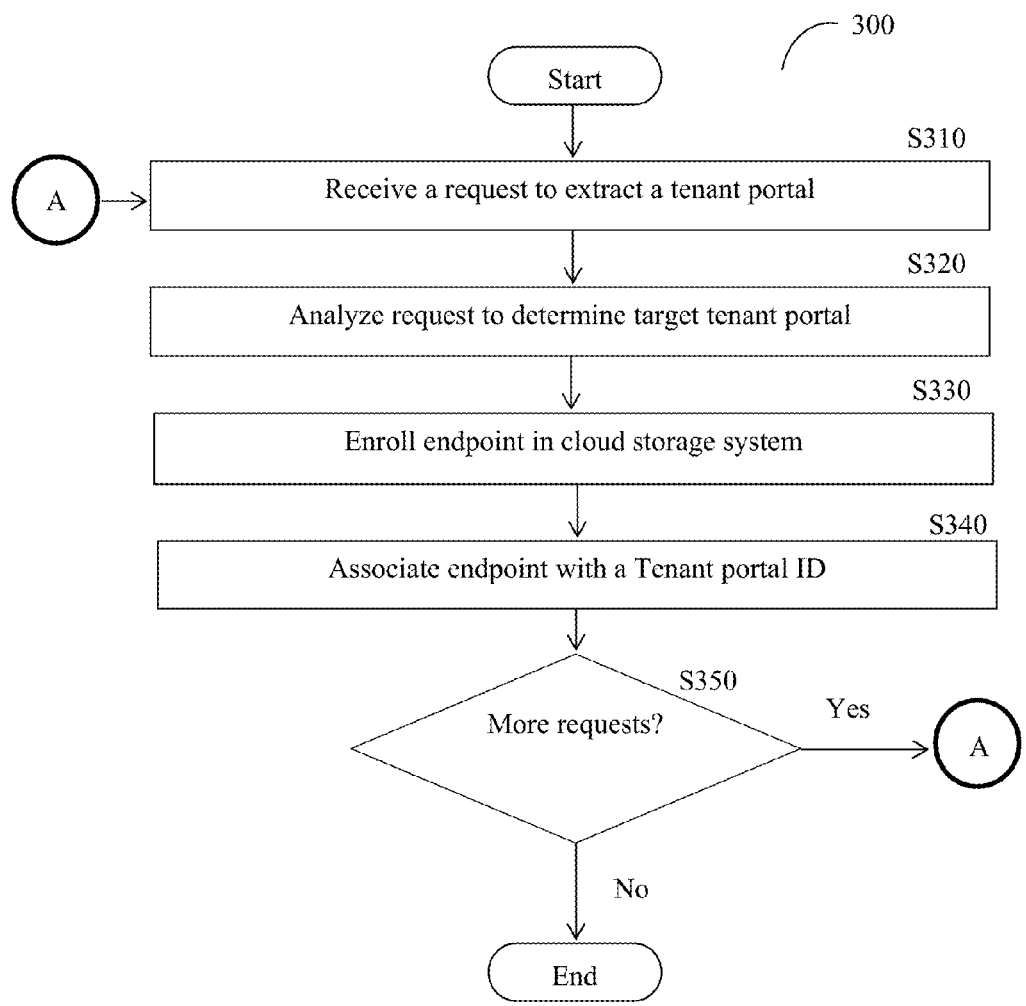
FIG. 3 is a flowchart illustrating the handling of web portal requests according to an embodiment.

FIG. 3 is a non-limiting and exemplary flowchart 300 illustrating a process for handling of web portal requests according to an embodiment. In S310, a web portal request to extract a tenant portal is received. In S320, the request is analyzed to determine a target tenant portal that will be extracted. In an embodiment, the destination portal may be detected based on the DNS name provided in the request header. In other embodiments, the target tenant portal may be detected based on a port, IP address, or a combination thereof. In some embodiments, transport level security (TLS) protocol with a server name indication (SNI) extension may be used to determine the intended target tenant portal in which context the request should be executed.

Before endpoints can use cloud storage services, endpoints need to be enrolled into the CSS 140, associated with a specific tenant, and assigned to a specific user of the tenant. In S330, an endpoint is enrolled in the CSS 140. Enrollment may be further classified as a local enrollment or remote enrollment. Local enrollment and remote enrollment processes are discussed further herein below with respect to FIGS. 4 and 8, respectively. In S340, based on relevant enrollment information, the endpoint is associated with a tenant portal. In S350, it is checked whether additional requests to extract tenant portals have been received. If so, execution continues with S310; otherwise, execution terminates.

Figure 4:
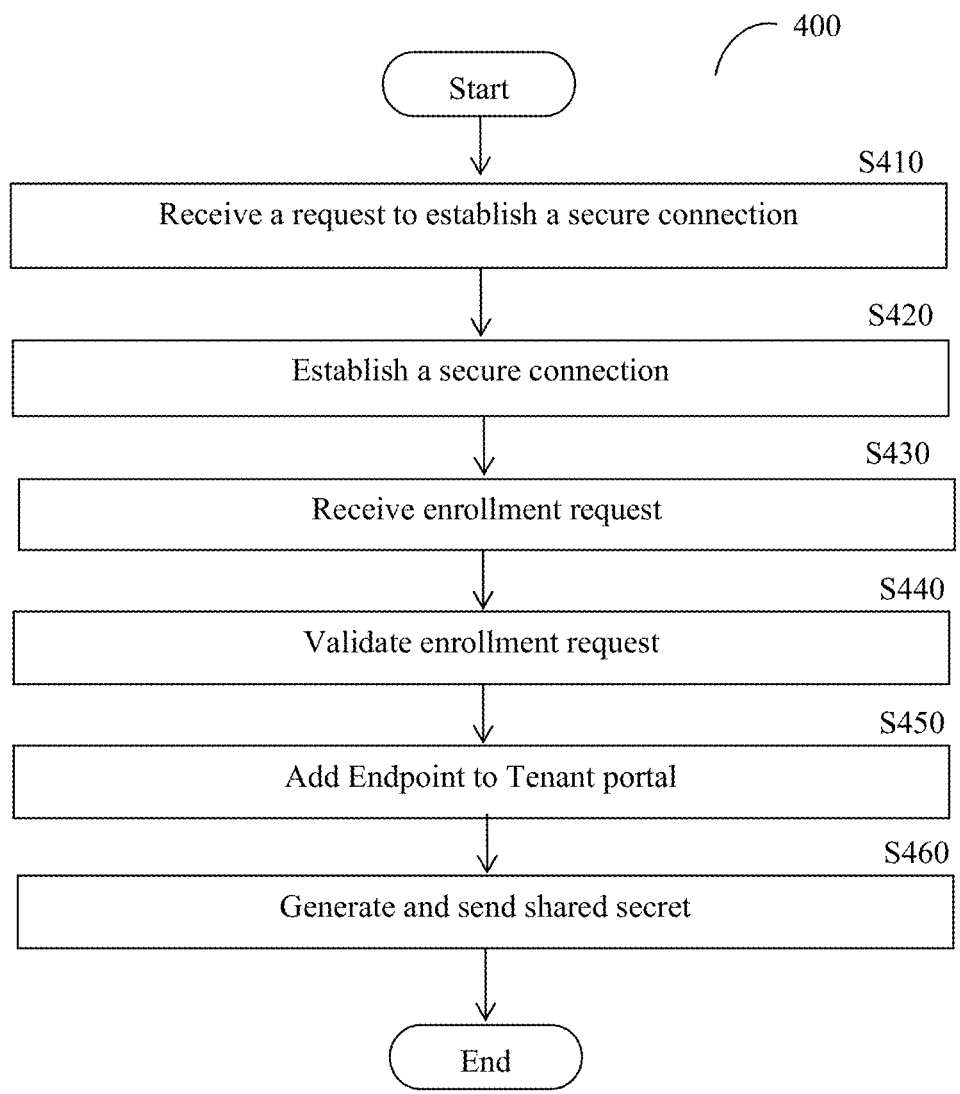
FIG. 4 system is a flowchart illustrating a local enrollment according to an embodiment.

FIG. 4 is an exemplary and non-limiting flowchart 400 illustrating a local enrollment process according to an embodiment. In that embodiment, the enrollment process is performed on-premises by a tenant portal member who owns the endpoint. The local enrollment process may be performed by the cloud connector.

In S410, a request for establishing a secure connection between a cloud connector and the endpoint. The request may be initiated when a user (e.g., an administrator) provides an address of the cloud connector. In S420, a secure connection is established with the requesting endpoint. The connection may be a cloud transport protocol (CTP) connection being established as described in greater detail in the Ser. No. 13/205,238 application referenced above. In an embodiment, S420 may also include authentication of the cloud connector, for example, using a certificate.

In S430, a local enrollment request is received by the cloud connector. In various embodiments, the request is initiated when a user (e.g., an administrator) provides enrollment information such as, but not limited to, the tenant portal ID and a tenant member ID, or other authentication credentials. The enrollment request is received over the secure connection. In S440, an authentication step is performed to validate the enrollment request, for example, by verifying the authentication credentials provided in the request. If the validation is successful, in S450, a record is created for storing the endpoint in an entitlement database (not shown) maintained by the cloud connector, thereby permanently associating it with the present tenant portal and user.

In S460, a shared secret is generated and sent to the endpoint as an enrollment reply message. The endpoint may store the shared secret in a non-transient storage medium. Upon successful enrollment a management link (e.g., link 170) is generated between the endpoint and the cloud connector.

In one embodiment, the endpoint may subsequently use the shared secret for future authentications to the cloud connector 141. According to the embodiment, the enrollment request includes the shared secret. Upon reception of the shared secret, the cloud connector is configured to search if the endpoint sending the request is found in the entitlement database. If so, the shared secret is verified. Upon successful verification, a management link (e.g., link 170) is generated between the endpoint and the cloud connector.

It should be appreciated that when the above local enrollment technique is used, the tenant portal member's authentication credentials do not need to be stored in the endpoint. Furthermore, this technique may allow revoking access to specific compromised devices by simply revoking the shared secret. As an example, if a tenant no longer wishes for an endpoint to be associated with the tenant's tenant portal, the tenant may execute a revoke command available in, e.g., the global administration portal, to remove the device from the tenant portal.

In another embodiment, certificate based authentication such as, but not limited to, public key infrastructure (PKI) is used in place of the shared secret. For example, in such an embodiment, the CSS provides to the endpoint a signed certificate, which the endpoint can use for future authentications to the cloud connector 141.

In another embodiment, rather than the member ID and authentication credentials being manually provided by the owner, the tenant portal member authenticates based on a single sign on (SSO) protocol, such as Kerberos or security assertion markup language (SAML). Authentication via a SSO protocol is discussed further herein below with respect to FIG. 6.

In yet another embodiment, rather than the member ID and authentication credentials being manually provided by the owner, the tenant portal member can authorize the endpoint to authorize the perform self-enrollment using an authorization protocol (for example OAuth).

Figure 11:
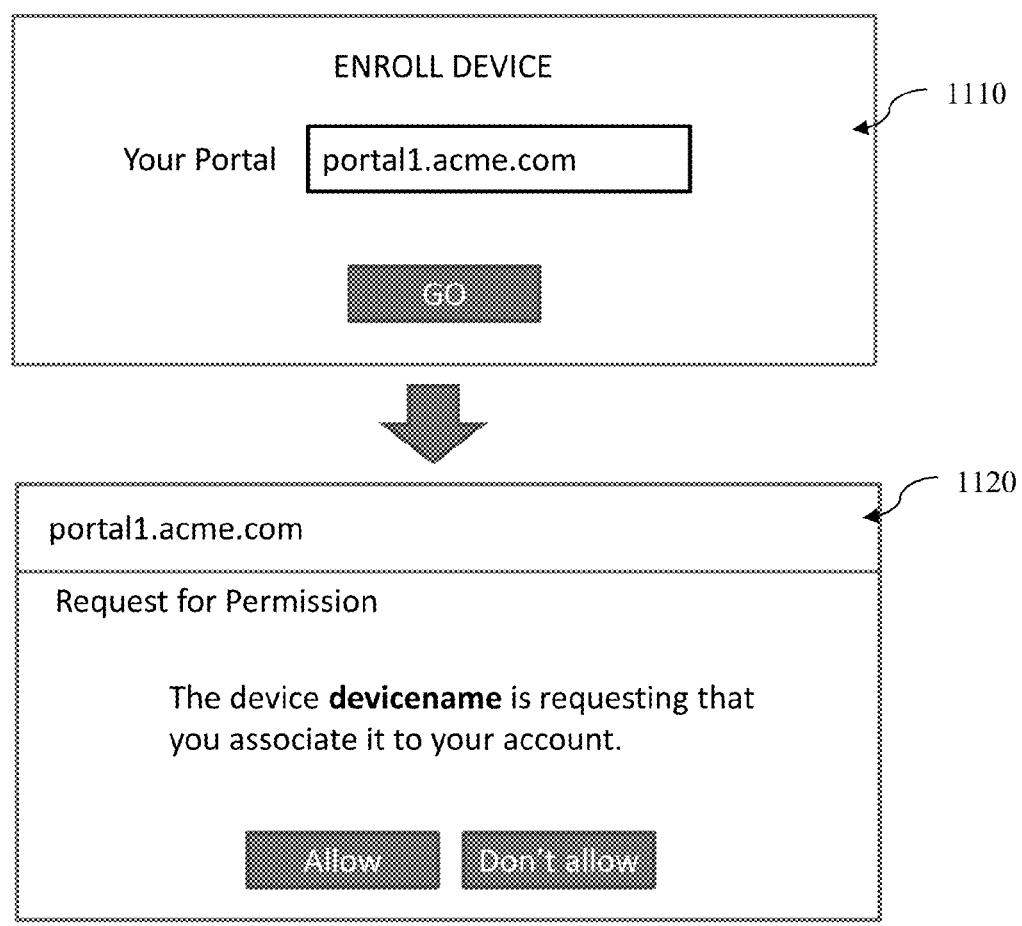
FIG. 11 is an exemplary screenshot of a user interface utilized for authorizing enrollment of an endpoint according to an embodiment.

As illustrated in an exemplary screenshot 1110 provided in FIG. 11, a user interface portal member enters the tenant portal ID. In response, if the member is not already authenticated to the web portal, the web portal prompts the member for authentication. Upon successful authentication, a window 1120 generated by the web portal is displayed. In the window 1120, a request for authorization by the member is provided. Upon authorization, the endpoint is enrolled in the CSS as discussed further herein above. Then, the member is redirected back to a local interface of the endpoint.

In yet another embodiment, rather than the owner manually providing the tenant portal ID, the tenant portal ID can be pre-configured in the endpoint. As a non-limiting example, a tenant portal ID may be provided by a custom installer with hard coded tenant portal ID, by the Windows Registry, or by setting the tenant portal ID when the device is manufactured. In embodiments where the tenant portal ID is hard coded, one installer process is created per tenant portal. This package may be created either as needed or in advance, and contains the tenant portal ID hard coded therein. In such embodiments, a user logs in to the tenant portal and downloads the installer process using a download link. When installing the agent, the correct tenant portal is automatically connected to without requiring further user input.

Figure 5:
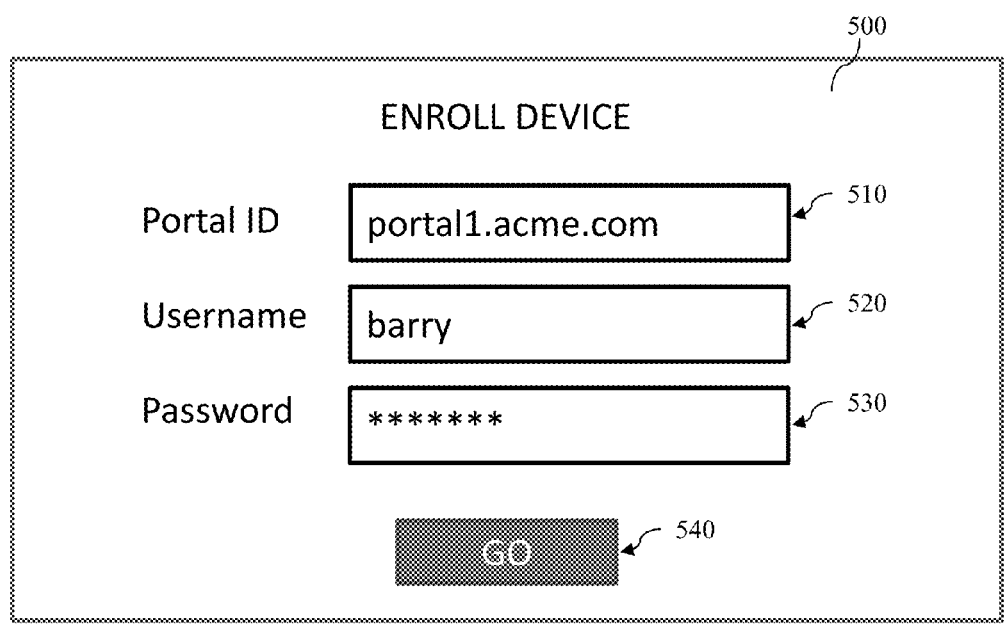
FIG. 5 is an exemplary screenshot of a user interface utilized for manually enrolling an endpoint to a multi-tenant cloud storage system.

FIG. 5 is an exemplary screenshot 500 of a user interface utilized for manually enrolling an endpoint to a multi-tenant cloud storage according to an embodiment. In this embodiment, to request enrollment, a user must submit a tenant portal ID, the member ID, and some form of authentication credentials such as a shared secret or certificate. The tenant portal ID may be entered into Portal ID Box 510, the Member ID may be entered into Username Box 520, and the shared secret or certificate may be entered into Password Box 530. Once all boxes have been properly filled in, the user may proceed to click the Go Button 540 and begin enrollment.

Figure 6:
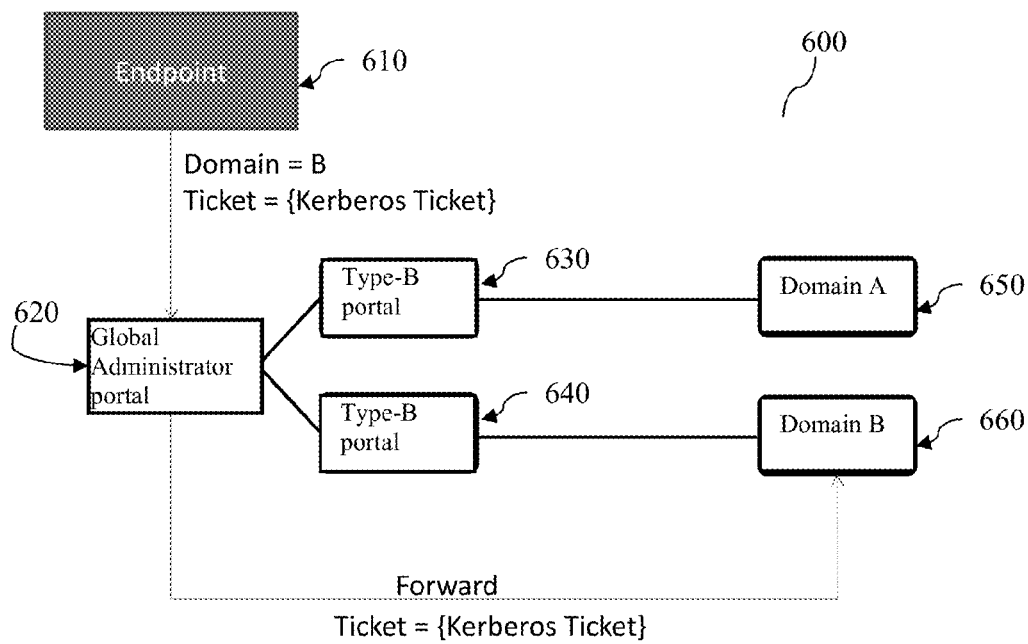
FIG. 6 is a schematic diagram illustrating authentication using single sign-on protocols according to an embodiment.

FIG. 6 is a non-limiting schematic diagram 600 illustrating authentication using a SSO protocol according to an embodiment. In this embodiment, an endpoint 610 is integrated with Active Directory ("AD") Domain 660 through the Global Administration Portal 620. Type-B portals 630 and 640 are integrated with domain 650 and domain 660, respectively. An endpoint 610 connects to a cloud connector (not shown in FIG. 6) based on a DNS address of the global administration portal 620. An endpoint 610 also sends to the cloud connector the domain name of the endpoint, and a ticket or token previously received from that domain 660. Based on the domain, the cloud connector is configured determine that the endpoint 610 belongs to the portal 640 and forward the ticket to the domain 660. If the ticket is successfully validated, the endpoint 610 is added to the portal 640. It should be appreciated that this process allows endpoints to be automatically and silently enrolled to the correct tenant, without any user intervention.

Figure 7:
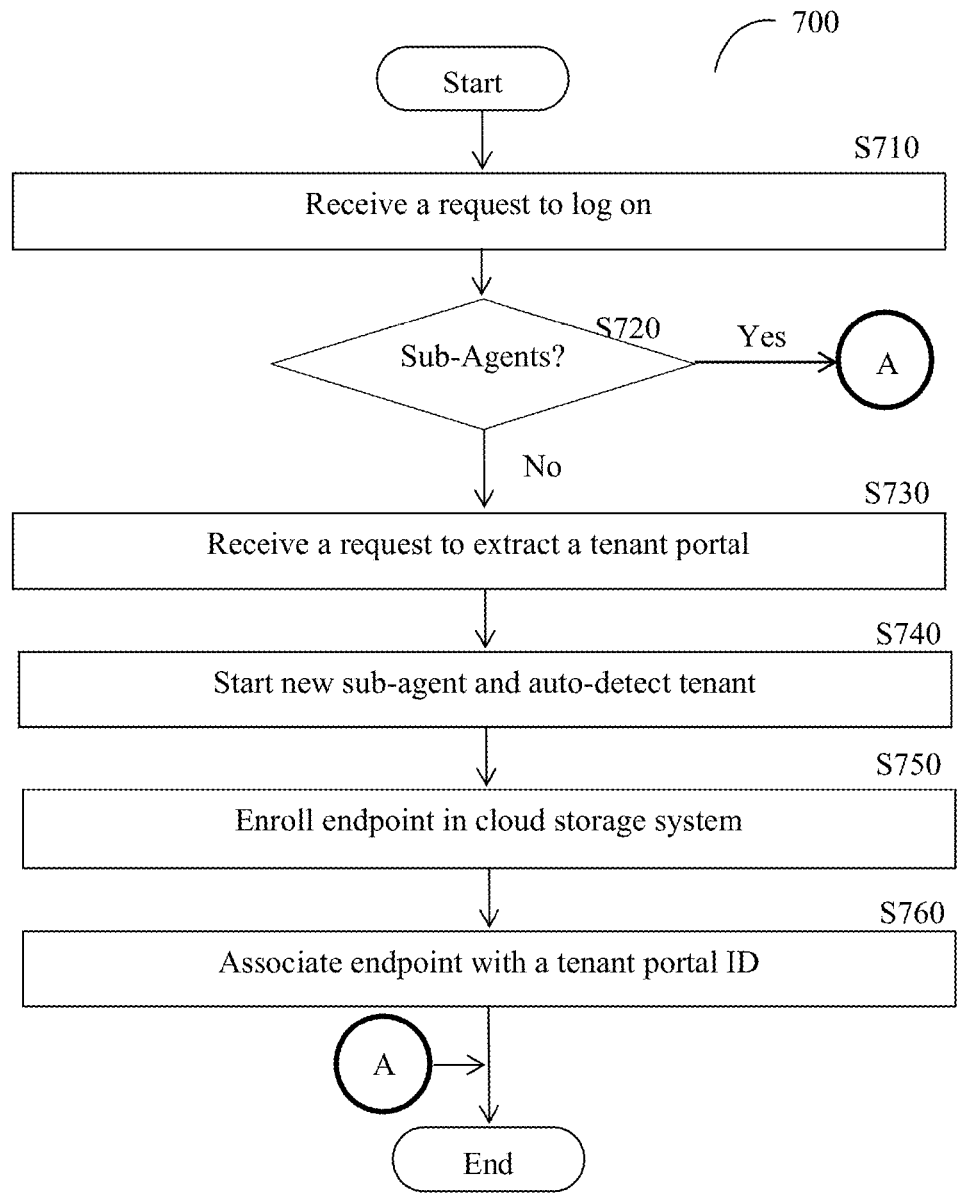
FIG. 7 is a flowchart illustrating an enrollment involving utilization of a sub-agent according to an embodiment.

FIG. 7 is a non-limiting and exemplary flowchart 700 illustrating an enrollment process involving utilization of a sub-agent according to an embodiment. In this embodiment, a multi-user agent is installed on a shared multi-user computer, for example, a personal computer which is used by multiple employees working in shifts. A cloud-enabled background service (the "service") runs on the computer with system credentials, and is connected to a cloud connector using a CTP. The CTP is discussed in greater detail in the co-pending applications referenced above. In S710, when a user logs on to the computer, a logon program is executed in the user credentials. In S720, a check is performed to determine whether a sub-agent already exists for this user. If so, execution terminates; otherwise, execution proceeds with S730.

In S730, upon determining that the user does not already have a sub-agent, the logon program connects to the service using an inter-process communication channel (IPC), and a request to extract a tenant portal is received. In S740, a tenant is automatically detected. Automatic detection of tenants is described further herein below with respect to FIG. 10. In addition, the service may be provided with authentication credentials of the current user (such as, for example, a Kerberos ticket or token).

The service starts a new sub-agent for the user, and automatically enrolls the sub-agent with the CSS by sending an enrollment request. Each sub-agent then continues to perform all the functions of an endpoint, including but not limited to cloud file synchronization, on behalf of the designated user. It should be noted that the sub-agent impersonates the security permissions of the designated user. For example, the sub-agent can refuse reading files which the designated user does not have permission to read, and can refuse writing files which the designated user does not have permission to write.

In S750, the endpoint is enrolled in the cloud system as discussed further herein above with respect to FIG. 3. In S760, the endpoint is associated with a tenant portal ID.

Figure 8:
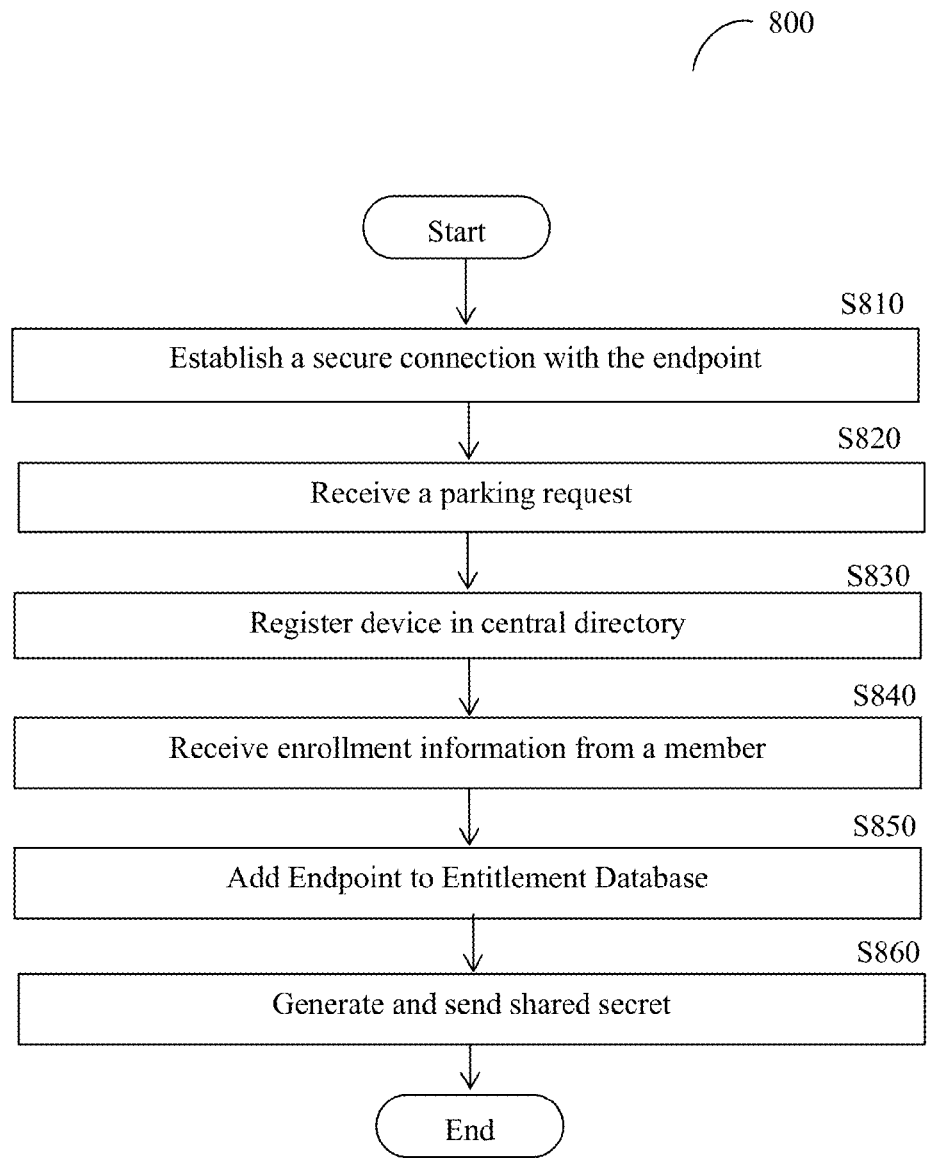
FIG. 8 is a flowchart illustrating a pre-configured enrollment protocol according to an embodiment.

FIG. 8 is an exemplary and non-limiting flowchart 800 illustrating a remote enrollment process for enrolling of an endpoint is disclosed according to an embodiment. The method may be performed by the cloud connector.

The endpoint is pre-configured with an address of the CSS (e.g., a DNS name of the global administration portal) and a secret, which is a unique enrollment code. The enrollment code may be, but is not limited to, a sequence of 10 random alphanumeric characters that is globally unique across endpoints. The pre-configuration information may be saved, as part of the device manufacturing process, in a memory of the endpoint. A copy of the enrollment code is provided to the owner of the endpoint. In an exemplary embodiment, this pre-configuration may occur as part of the endpoint manufacturing and/or setting process, and the pre-configured parameters may be stored in a flash memory device. A copy of the enrollment code may be provided to the owner of the endpoint (for example, via a printed letter supplied alongside the device, or by displaying the code on an LCD panel of the device). The enrollment code does not need to be known in advance by the CSS operator.

Upon activation of the endpoint, the endpoint looks up for the pre-configured address. As a result, in S810, a secure CTP connection is established between a cloud connector and the endpoint. An example for such a process is described in greater detail in the Ser. No. 13/205,238 application referenced above.

In S820, a parking request message containing the enrollment code is received at the cloud connector. The parking request is sent by the endpoint after verification of a CSS certificate. Upon successful verification, the endpoint remains connected to the cloud connector using the CTP connection, inactive and awaiting an activation message from the cloud connector.

In S830, the cloud connector is configured to register the endpoint in a central directory (not shown), along with its associated enrollment code.

At some later time, a member connects to the tenant portal and authenticates (for example using his credentials or by using a single sign on protocol such as SAML). To this end, enrollment code of the endpoint is provided. In such an event, the enrollment code, as well as the current member's tenant portal and member ID are received at the cloud connector. This information can be sent from the web portal (S840). The cloud connector is also configured to look up the enrollment code in the central directory. In S850, if a match is found, a record for this endpoint is added to the entitlement database of the connector, thereby associating the endpoint with the provided tenant portal and member.

In S860, a shared secret is generated and sent to the endpoint as part of an "Activate Device" message over the secure connection, along with the tenant portal ID. The endpoint stores the shared secret and tenant portal ID in a non-transient storage medium. The endpoint then uses the tenant portal ID and the provided shared secret for future authentications to the cloud connector.

It should be appreciated that the above embodiment allows the activation process to be performed through a web portal, without requiring a separate local interface on the endpoint. Furthermore, a single stock of pre-configured devices can be kept for all tenants. The specific tenant portal to which each device will be connected does not need to be known during the pre-configuration step.

In another embodiment, PKI (certificate based authentication) is used in place of the shared secret. For example, the CSS provides to the endpoint a signed certificate as part of the "Activate Device" message, which the endpoint can use for future authentications to the cloud connector.

Figure 9:
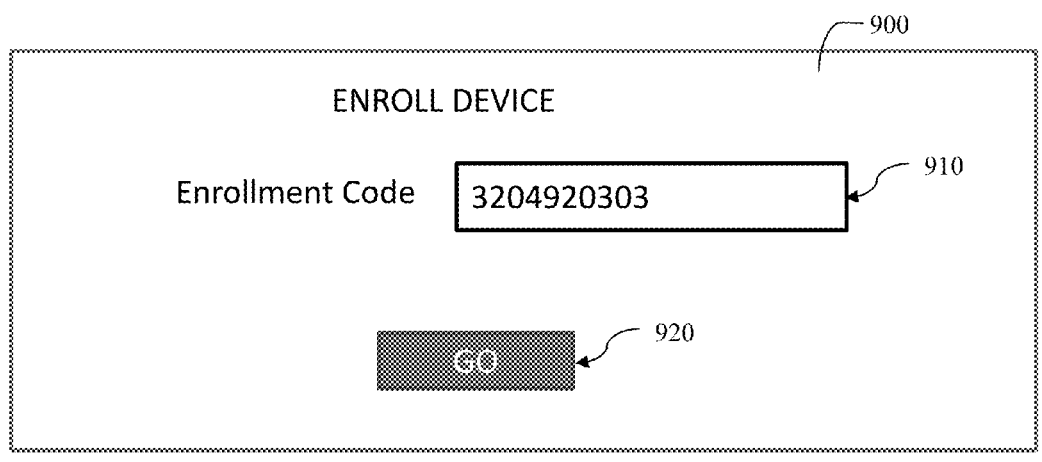
FIG. 9 is an exemplary screenshot of a user interface utilized for enrolling an endpoint to a multi-tenant cloud storage system from a web portal according to an embodiment.

FIG. 9 is an exemplary screenshot 900 of a user interface utilized for enrolling an endpoint to a multi-tenant cloud storage system from a web portal according to, e.g., the embodiment described in FIG. 8. In this embodiment, a user may enter the enrollment code through Enrollment Code Box 910. Once the enrollment code has been properly entered, the user may click the GO BUTTON 920 to initiate enrollment.

Figure 10:
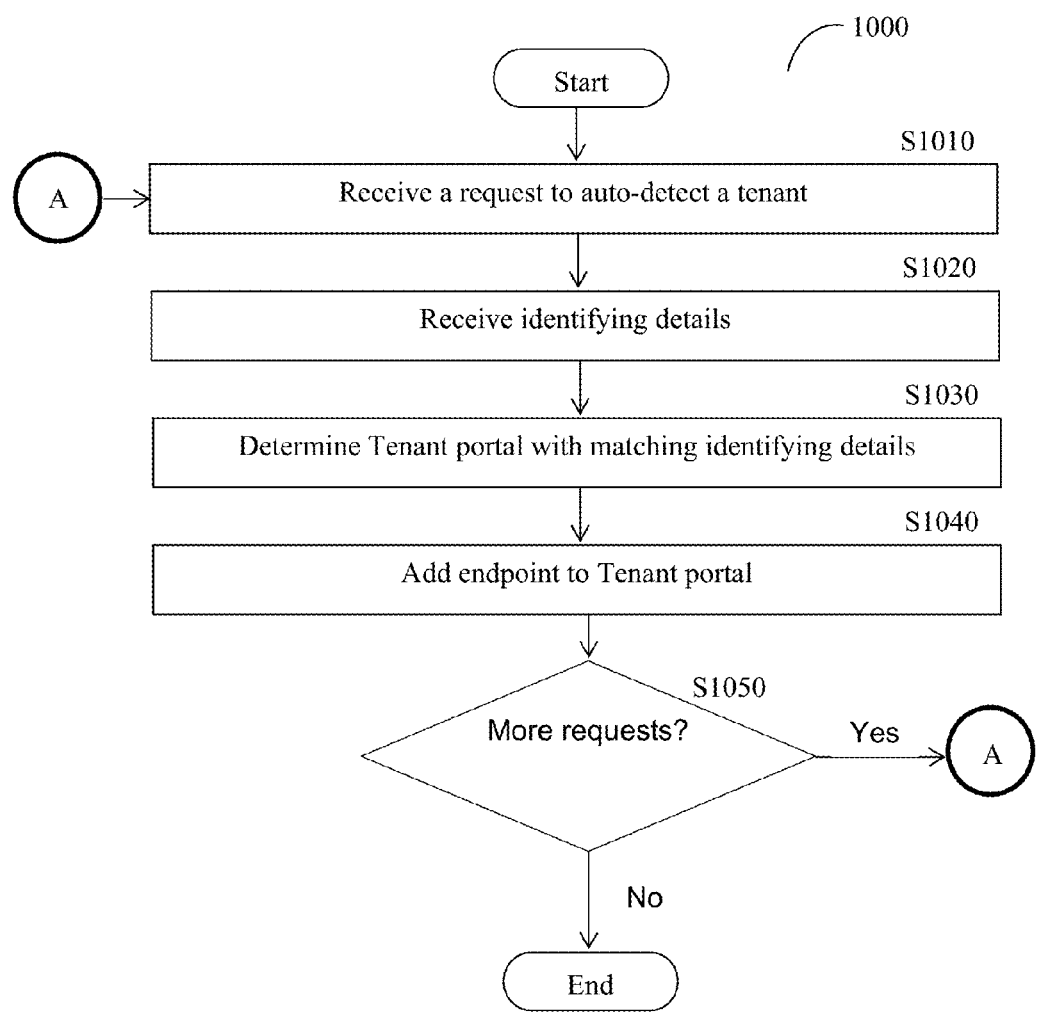
FIG. 10 is a flowchart illustrating automatic tenant detection and portal member registration according to an embodiment.

FIG. 10 is an exemplary and non-limiting flowchart 1000 illustrating automatic tenant detection and user registration according to an embodiment. In that embodiment, rather than requesting the owner to specify which tenant to connect to by typing the tenant portal ID, an endpoint is pre-configured with an address of the CSS (for example, the DNS name of the global administration portal). Then, rather than sending the tenant portal ID to the cloud connector, the endpoint may send details identifying the tenant from the endpoint to the cloud connector.

In S1010, a request to auto-detect a tenant is received. In S1020, details for identifying the tenant are received. These details may be for example, the Active Directory domain to which the endpoint is connected. In S1030, based on the identifying details, the tenant portal that the endpoint should be added to is determined. This determination may be based on determination of a tenant portal having identification details that are identical matches to the details received in S1020. In S1040, upon verification that a matching tenant portal has been determined, the endpoint is added to the matching tenant portal. In S1050, it is checked whether additional requests to auto-detect tenants have been received. If so, execution continues with S1010; otherwise, execution terminates.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture.

Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and micro-instruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A cloud storage system, comprising:
a plurality of tenant portals, wherein each tenant portal is an isolated logical partition of the cloud storage system, wherein the plurality of tenant portals includes at least a first type tenant portal and a second type tenant portal, wherein each of the first type tenant portal and the second type tenant portal is configured to provision a respective set of members with a different storage policy; and
at least one cloud connector configured to associate endpoints of members to their respective tenant portals.

2. The cloud storage system of claim 1, wherein each different storage policy includes at least one reservation of storage resources and deduplication domains for each respective tenant and its respective set of members.

3. The cloud storage system of claim 1, wherein each of the first type tenant portal and the second type tenant portal are configured with a single subscription plan and with a plurality of add-on packages.

4. The cloud storage system of claim 1, wherein the association of endpoints to a tenant portal is performed through an enrollment process, wherein the enrollment process is any one of: a local enrollment process, and a remote enrollment process.

5. The cloud storage system of claim 4, wherein the cloud connector is further configured to:
receive an enrollment request generated by an endpoint, wherein the endpoint is preconfigured with a tenant portal in which to locally enroll to;

add the endpoint to the tenant portal;
generate authentication credentials for the endpoint; and
provide the authentication credentials to the endpoint.

6. The cloud storage system of claim 4, wherein the cloud connector is further configured to:
receive a parking request from an endpoint, wherein the parking request includes at least an enrollment code;
receive an activation request from a tenant member, wherein the activation request includes at least an enrollment code initiating the remote enrollment process;
search for an endpoint that previously provided a parking request including an enrollment code matching the enrollment code in the activation request;
associate the endpoint with the tenant portal and the tenant member when a match is found;
generate authentication credentials for the endpoint; and
provide the authentication credentials to the endpoint.

7. The cloud storage system of claim 4, wherein a single sign on protocol is utilized to provide authentication credentials required for the enrollment process.

8. The cloud storage system of claim 1, wherein a single endpoint allows a plurality of members to access at least one of the plurality of tenant portals, wherein each member of a tenant portal receives services based on its a respective tenant storage policy.

9. A method for enrolling an endpoint in a cloud storage system (CSS) including at least one cloud connector, comprising:
determining, by the at least one cloud connector, a target tenant portal respective of an enrollment request to enroll an endpoint in the CSS, upon receiving the enrollment request;
associating, by a local enrollment process, the endpoint with a tenant portal in the CSS based in part on the determination of the target tenant portal, wherein the local enrollment process further comprises:
receiving the enrollment request generated by an agent installed in the endpoint, wherein the agent is preconfigured with a tenant portal in which to enroll;
adding the endpoint to the tenant portal;
generating credentials for the endpoint; and
providing the credentials to the endpoint.

10. The method of claim 9, wherein the enrollment request is generated per tenant portal on-the-fly.

11. The method of claim 9, wherein a single-sign-on protocol is utilized to provide authentication credentials required for the local enrollment process.

12. A non-transitory computer readable medium having stored thereon instructions for causing one or more processing units to execute the method comprising the steps of:
determining, by the at least one cloud connector, a target tenant portal respective of an enrollment request to enroll an endpoint in the CSS, upon receiving the enrollment request;
associating, by a local enrollment process, the endpoint with a tenant portal in the CSS based in part on the determination of the target tenant portal, wherein the local enrollment process further comprises:
receiving the enrollment request generated by an agent installed in the endpoint, wherein the agent is preconfigured with a tenant portal in which to enroll;
adding the endpoint to the tenant portal;
generating credentials for the endpoint; and
providing the credentials to the endpoint.

13. A system for automatically enrolling an endpoint in a cloud storage system (CSS) including at least one cloud connector, comprising:
a processor; and
a memory coupled to the processor, wherein the memory contains instructions that, when executed by the processor, configure the system to:
enroll an endpoint in the CSS;
determine, by the at least one cloud connector, a target tenant portal respective of the enrollment request, upon receiving an enrollment request generated by an agent installed in the endpoint, wherein the agent is preconfigured with a tenant portal in which to enroll; and
associate the endpoint with the preconfigured tenant portal in the CSS based in part on the determination of the target tenant portal, wherein the association further comprises:
adding the endpoint to the tenant portal;
generating credentials for the endpoint; and
providing the credentials to the endpoint.

14. A method for enrolling an endpoint in a cloud storage system (CSS) including at least one cloud connector, comprising:
determining, by the at least one cloud connector, a target tenant portal respective of an enrollment request to enroll an endpoint in the CSS, upon receiving the enrollment request; and
associating, by a remote enrollment process, the endpoint with a tenant portal in the CSS based in part on the determination of the target tenant portal, wherein the remote enrollment process further comprises:
receiving a parking request from an endpoint, wherein the parking request includes at least an enrollment code;
receiving an activation request from a tenant member, wherein the activation request includes the at least an enrollment code;
searching for an endpoint that previously provided a parking request including an enrollment code matching the at least one enrollment code in the activation request;
associating the endpoint with the tenant portal and the tenant member when a match is found;
generating authentication credentials for the endpoint; and
providing the authentication credentials to the endpoint.

15. The method of claim 14, wherein the endpoint is pre-configured with at least an address of the CSS and the enrollment code contained in the parking request.

* * * * *